(12) United States Patent
Ding

(10) Patent No.: US 12,477,669 B2
(45) Date of Patent: Nov. 18, 2025

(54) DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Feng Ding, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 301 days.

(21) Appl. No.: 17/262,094

(22) PCT Filed: Oct. 16, 2020

(86) PCT No.: PCT/CN2020/121460
§ 371 (c)(1),
(2) Date: Mar. 28, 2023

(87) PCT Pub. No.: WO2022/036832
PCT Pub. Date: Feb. 24, 2022

(65) Prior Publication Data
US 2023/0217607 A1  Jul. 6, 2023

(30) Foreign Application Priority Data
Aug. 17, 2020 (CN) .......................... 202010826880.3

(51) Int. Cl.
*H05K 5/02* (2006.01)
(52) U.S. Cl.
CPC .................................. *H05K 5/0217* (2013.01)
(58) Field of Classification Search
CPC .... H05K 5/0217; G06F 1/1652; G06F 1/1681
See application file for complete search history.

(56) References Cited

U.S. PATENT DOCUMENTS 9,047,055 B2 * 6/2015 Song ......................... E05D 3/14
9,818,961 B2   11/2017 Hiroki et al.
(Continued)

FOREIGN PATENT DOCUMENTS

CN   106486018 A   3/2017
CN   106919223 A   7/2017
(Continued)

OTHER PUBLICATIONS

Machine translation of WO2019080240A1 (Year: 2025).*
Machine translation of CN110035151A (Year: 2025).*

*Primary Examiner* — Sagar Shrestha

(57) ABSTRACT

A display device is provided and includes a flexible display panel, a middle frame, and a stretching and folding assembly. The flexible display panel has a bendable area. The middle frame encompasses a periphery of the flexible display panel. The stretching and folding assembly is disposed in the bendable area and includes an elastic assembly, connecting blocks, and connecting pieces. The elastic assembly covers the bendable area and an area of the middle frame corresponding to the bendable area. The connecting blocks are disposed at two ends of the elastic assembly. Each connecting piece is disposed between two adjacent ones of the connecting blocks to connect the two adjacent ones of the connecting blocks and configured to cause the connecting blocks to drive, when the flexible display panel is bent, the area of the middle frame corresponding to the bendable area to be bent.

20 Claims, 6 Drawing Sheets

(56) References Cited

U.S. PATENT DOCUMENTS

| | | | |
|---|---|---|---|
| 9,829,924 B2* | 11/2017 | Shin | G06F 1/1656 |
| 10,121,395 B2 | 11/2018 | Fan et al. | |
| 10,199,585 B2 | 2/2019 | Hiroki et al. | |
| 10,476,011 B2 | 11/2019 | Kang et al. | |
| 10,840,464 B2 | 11/2020 | Hiroki et al. | |
| 10,847,735 B2 | 11/2020 | Seo | |
| 10,890,951 B1* | 1/2021 | Watamura | G06F 1/1681 |
| 10,968,673 B2* | 4/2021 | Aagaard | E05D 11/082 |
| 11,114,629 B2* | 9/2021 | Myeong | G06F 1/1616 |
| 11,573,610 B2* | 2/2023 | Hsu | G06F 1/1681 |
| 2018/0329460 A1* | 11/2018 | Song | G06F 1/1626 |
| 2019/0148656 A1 | 5/2019 | Hiroki et al. | |
| 2020/0170127 A1 | 5/2020 | Kim | |
| 2020/0253068 A1* | 8/2020 | Cha | H05K 5/0226 |
| 2021/0200277 A1* | 7/2021 | Park | G06F 1/1652 |
| 2021/0222729 A1* | 7/2021 | Hsu | E05D 7/00 |
| 2023/0156934 A1* | 5/2023 | Jiang | G06F 1/1681 |
| | | | 361/807 |

FOREIGN PATENT DOCUMENTS

| | | |
|---|---|---|
| CN | 107437378 A | 12/2017 |
| CN | 107644590 A | 1/2018 |
| CN | 207115245 U | 3/2018 |
| CN | 109686261 A | 4/2019 |
| CN | 110035151 A | 7/2019 |
| CN | 111223402 A | 6/2020 |
| CN | 111383533 A | 7/2020 |
| KR | 20170022684 A | 3/2017 |
| KR | 20200052621 A | 5/2020 |
| TW | 201624680 A | 7/2016 |
| WO | 2020105794 A1 | 5/2020 |

\* cited by examiner

DISPLAY DEVICE

TECHNICAL FIELD

The present disclosure relates to a display device. In detail, a stretching and folding assembly is disposed in a bendable area of a flexible display panel of the display device in the present disclosure. When the flexible display panel is bent, the stretching and folding assembly can drive a middle frame encompassing the flexible display panel to be bent.

BACKGROUND ART

With the development of display device technologies, more and more display devices use flexible display panels. Accordingly, the display devices have advantages of being bendable and foldable, having large-sized screens, and being portable. Although flexible display panel are bendable and foldable, bendable performance is limited. As such, auxiliary elements for supporting bendable areas of the flexible display panels are required.

In the conventional auxiliary elements for supporting the bendable areas of the flexible display panels, connecting relationships of components are not sufficient. Accordingly, when the flexible display panels are bent, the auxiliary elements are separated easily. Furthermore, strength ability of the auxiliary bendable elements is not sufficient, and thus the flexible display panels are not smooth when being bent.

SUMMARY OF INVENTION

Technical Problem

In view of this, it is necessary to provide a display device to encompass a bendable are of a flexible display panel by a stretching and folding assembly to increase reliability of the flexible display panel when the flexible display panel is bent.

Technical Solution to the Problem

Technical Solution

An objective of the present disclosure is to provide a display device in which a stretching and folding assembly covers a bendable area and an area of a middle frame corresponding to the bendable area, and structures in which connecting blocks and connecting pieces are connected together are disposed in the area of the middle frame corresponding to the bendable area. The middle frame encompasses a periphery of a flexible display panel. As such, when the flexible display panel of the display device is bent or folded, the connecting pieces are stretched to drive the connecting blocks to bend or fold or the display device, thereby increasing quality of bending the display device and improving user experience as well.

To achieve the above-mentioned objective, the present disclosure provides a display device including a flexible display panel, a middle frame, and a stretching and folding assembly. The flexible display panel has a bendable area. The middle frame encompasses a periphery of the flexible display panel. The stretching and folding assembly is disposed in the bendable area and includes an elastic assembly, a plurality of connecting blocks, and a plurality of connecting pieces. The elastic assembly covers the bendable area and an area of the middle frame corresponding to the bendable area. The connecting blocks are disposed at two ends of the elastic assembly. Each of the connecting pieces is disposed between two adjacent ones of the connecting blocks to connect the two adjacent ones of the connecting blocks and configured to cause the connecting blocks to drive, when the flexible display panel is bent, the area of the middle frame corresponding to the bendable area to be bent. The stretching and folding assembly further includes a strengthening bar and a plurality of connecting patches. The strengthening bar is fixed on the elastic assembly to increase stability of the bendable area. The strengthening bar is plastically melted to be connected to the elastic assembly. The connecting patches are disposed at two ends of the strengthening bar to fix the strengthening bar.

In the present disclosure, a material of the elastic assembly is rubber.

In the present disclosure, the stretching and folding assembly further includes a plurality of clamping bars disposed at two sides of the elastic assembly and configured to fix the elastic assembly, and the clamping bars are embedded to the connecting blocks.

In the present disclosure, a material of the strengthening bar is a hard plastic.

In the present disclosure, the middle frame includes a top frame and a bottom frame, the elastic assembly includes a first elastic assembly and a second elastic assembly, and the first elastic assembly and the second elastic assembly are symmetrically and respectively disposed on the top frame and the bottom frame.

In the present disclosure, the connecting blocks are disposed at the two ends of the elastic assembly in parallel.

In the present disclosure, the flexible display panel is divided, centered on the bendable area, into a top display part and a bottom display part, and the stretching and folding assembly symmetrically covers, centered on the bendable area, a first bendable area positioned in the top display part and a second bendable area positioned in the bottom display part.

To achieve the above-mentioned objective, the present disclosure provides a display device including a flexible display panel, a middle frame, and a stretching and folding assembly. The flexible display panel has a bendable area. The middle frame encompasses a periphery of the flexible display panel. The stretching and folding assembly is disposed in the bendable area and includes an elastic assembly, a plurality of connecting blocks, and a plurality of connecting pieces. The elastic assembly covers the bendable area and an area of the middle frame corresponding to the bendable area. The connecting blocks are disposed at two ends of the elastic assembly. Each of the connecting pieces is disposed between two adjacent ones of the connecting blocks to connect the two adjacent ones of the connecting blocks and configured to cause the connecting blocks to drive, when the flexible display panel is bent, the area of the middle frame corresponding to the bendable area to be bent.

In the present disclosure, a material of the elastic assembly is rubber.

In the present disclosure, the stretching and folding assembly further includes a plurality of clamping bars disposed at two sides of the elastic assembly and configured to fix the elastic assembly, and the clamping bars are embedded to the connecting blocks.

In the present disclosure, the stretching and folding assembly further includes a strengthening bar fixed on the elastic assembly to increase stability of the bendable area.

In the present disclosure, the stretching and folding assembly further includes a plurality of connecting patches disposed at two ends of the strengthening bar to fix the strengthening bar.

In the present disclosure, the strengthening bar is plastically melted to be connected to the elastic assembly.

In the present disclosure, a material of the strengthening bar is a hard plastic.

In the present disclosure, the middle frame includes a top frame and a bottom frame, the elastic assembly includes a first elastic assembly and a second elastic assembly, and the first elastic assembly and the second elastic assembly are symmetrically and respectively disposed on the top frame and the bottom frame.

In the present disclosure, the connecting blocks are disposed at the two ends of the elastic assembly in parallel.

In the present disclosure, the flexible display panel is divided, centered on the bendable area, into a top display part and a bottom display part, and the stretching and folding assembly symmetrically covers, centered on the bendable area, a first bendable area positioned in the top display part and a second bendable area positioned in the bottom display part.

The detailed technology and preferred embodiments implemented for the present disclosure are described in the following paragraphs accompanying the appended drawings for people skilled in this field to well appreciate the features of the claimed disclosure.

Advantageous Effects of the Invention

Advantageous Effects

Compared with the prior art, the display device of the present disclosure includes the stretching and folding assembly disposed in the bendable area. The structures in which the connecting blocks and the connecting pieces are connected together are disposed in the area of the middle frame corresponding to the bendable area. The middle frame encompasses the periphery of the flexible display panel. As such, when the flexible display panel of the display device is bent or folded, the connecting pieces are stretched to drive the connecting blocks to bend or fold or the display device, thereby increasing quality of bending the display device and improving user experience as well.

EMBODIMENTS OF THE INVENTION

Detailed Description of Embodiments

In the following description, the present disclosure will be explained with reference to example embodiments thereof. However, these example embodiments are not intended to limit the present disclosure to any specific environment, applications or particular implementations described in these example embodiments. Therefore, description of these example embodiments is only for purpose of illustration rather than to limit the present disclosure. It shall be appreciated that, in the following example embodiments and the attached drawings, elements unrelated to the present disclosure are omitted from depiction; and dimensional relationships among individual elements in the attached drawings are illustrated only for ease of understanding, but not to limit the actual scale.

Figure 1:
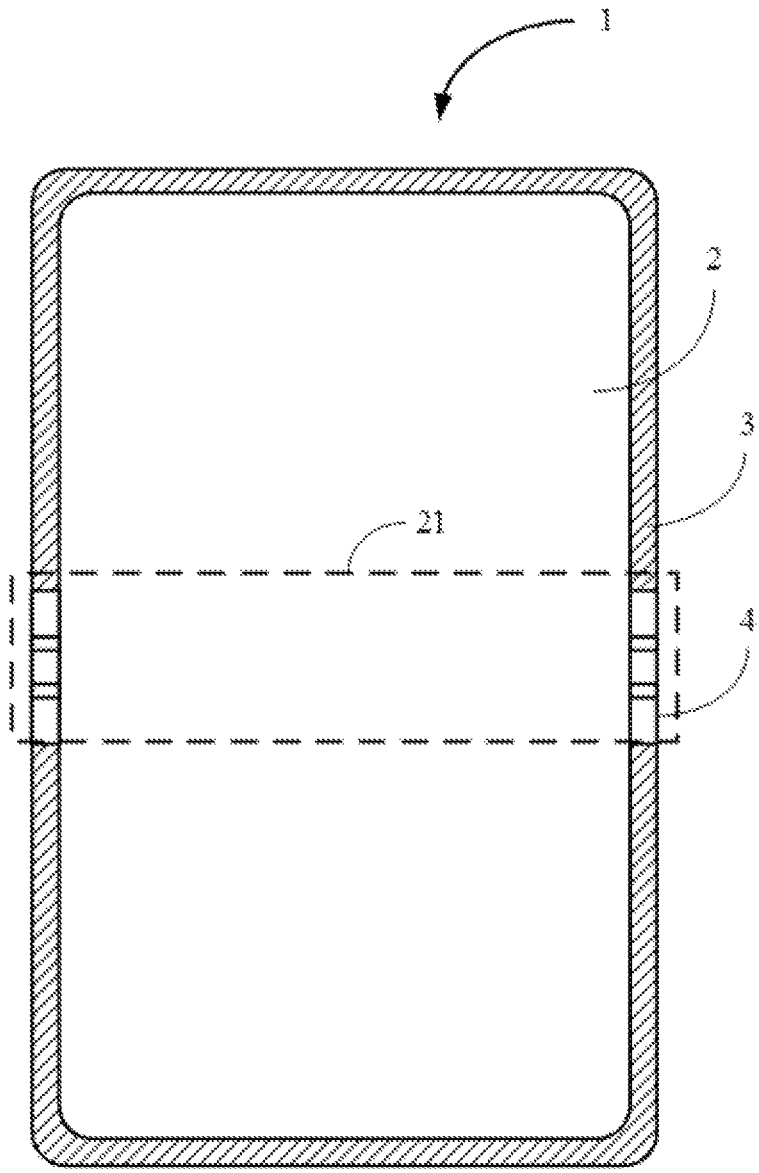
FIG. 1 illustrates a front view of a display device of the present disclosure.
Figure 2:
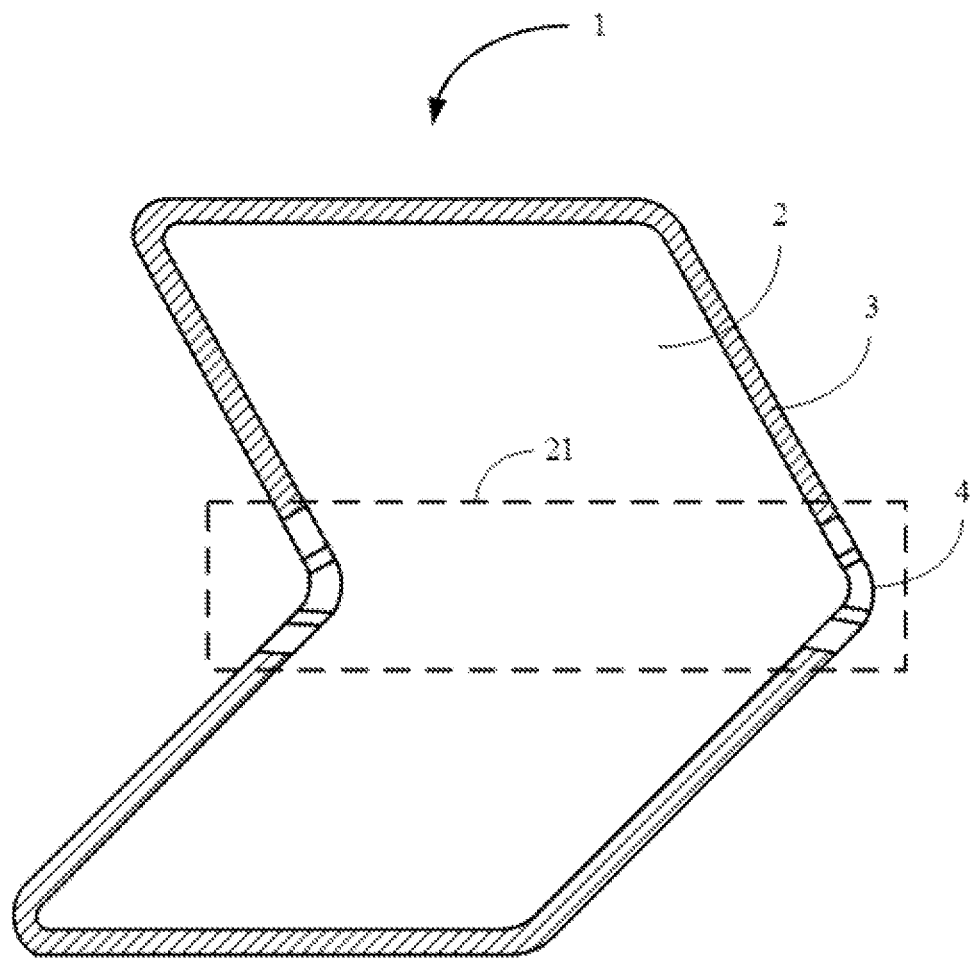
FIG. 2 illustrates that the display device of the present disclosure is bent.
Figure 3:
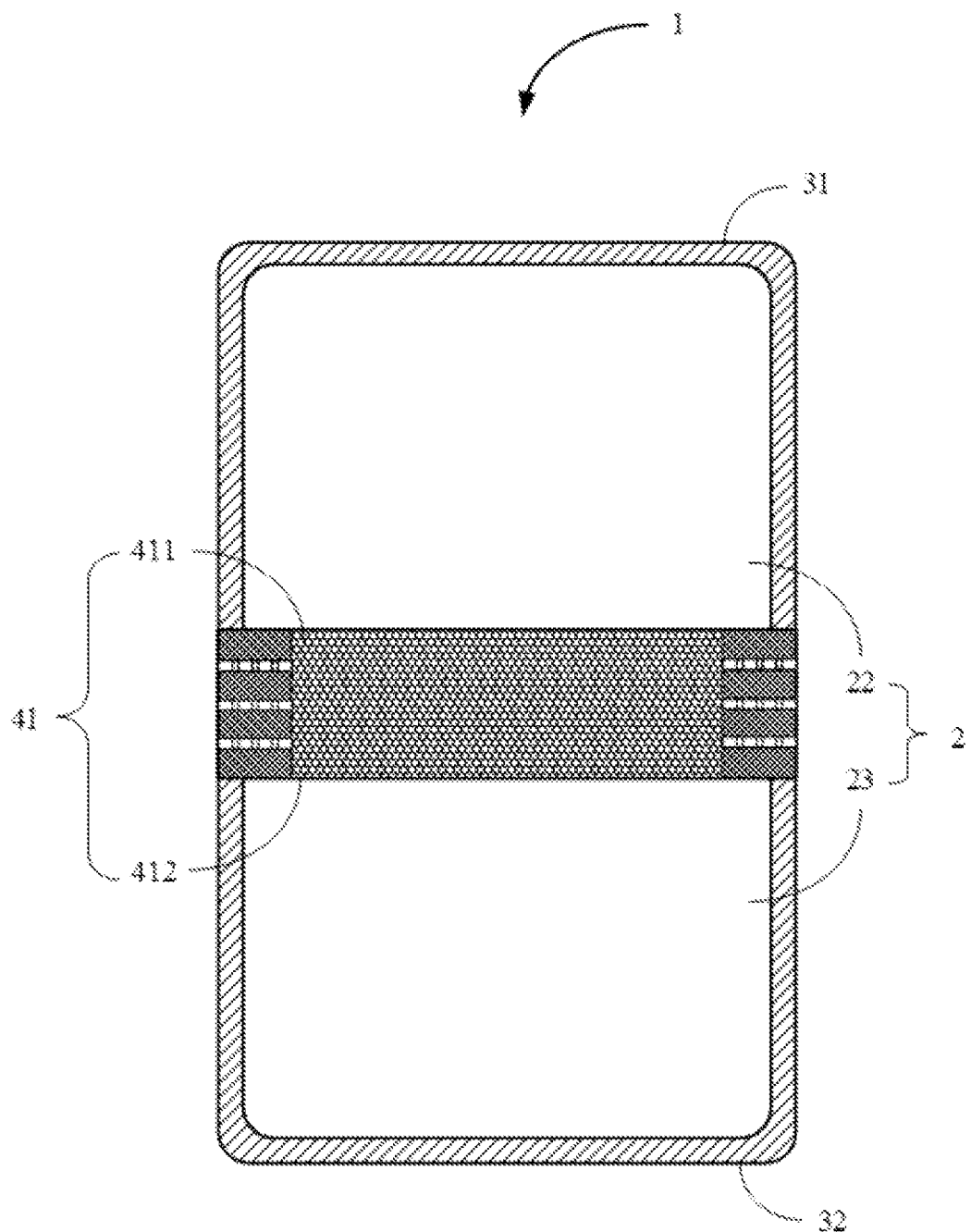
FIG. 3 illustrates a back view of the display device of the present disclosure.

Please refer to FIG. 1, FIG. 2, and FIG. 3. FIG. 1 illustrates a front view of a display device of the present disclosure. FIG. 2 illustrates that the display device of the present disclosure is bent. FIG. 3 illustrates a back view of the display device of the present disclosure. The display device 1 includes a flexible display panel 2, a middle frame 3, and a stretching and folding assembly 4. The flexible display panel 2 can be a bendable and foldable display screen and has a bendable area 21. The bendable area 21 is shaped as an arc or a deflection angle is formed in when the bendable area 21 is bent.

A flexible material, for example, a polymer, a sheet metal, or an ultra-thin glass, is usually used in a process of manufacturing the display panel 2 of the display device 1. As such, the display panel 2 has characteristics of being bendable and foldable.

The middle frame 3 of the display device 1 encompasses a periphery of the flexible display panel 2 to protect the flexible display panel 2 from being damaged when the flexible display panel 2 encounters pressure, friction, or impact. In order to provide sufficient supporting force for the flexible display panel 2 and coordinate bending and folding of the flexible display panel 2, a high strength and high hardness or a wear-resistant and corrosion-resistant material, for example, an aluminum alloy, stainless steel, or a liquid metal, can be but is not limited to a material for manufacturing the middle frame 3.

The stretching and folding assembly 4 is disposed in the bendable area 21. The flexible display panel 2 is divided, centered on the bendable area 21, into a top display part 22 and a bottom display part 23. The stretching and folding assembly 4 symmetrically covers, centered on the bendable area 21, a first bendable area positioned in the top display part 22 and a second bendable area positioned in the bottom display part 23.

The stretching and folding assembly 4 includes an elastic assembly 41, a plurality of connecting blocks 42, and a plurality of connecting pieces 43. A material of the elastic assembly 41 can be but is not limited to a compressible and elastic material, for example, rubber, a spring, or resin. The elastic assembly 41 covers the bendable area 21 and an area of the middle frame 3 corresponding to the bendable area 21. The area of the middle frame 3 corresponding to the bendable area 21 is an area which is driven with the bending or folding of the flexible display panel 2 when the flexible display panel 2 is bent or folded.

Similarly, the area of the middle frame 3 corresponding to the bendable area 21 is divided, centered on the bendable area 21, into a top frame 31 and a bottom frame 32. The elastic assembly 41 includes a first elastic assembly 411 and a second elastic assembly 412. The first elastic assembly 411 and the second elastic assembly 412 are symmetrically and respectively disposed on the top frame 31 and the bottom frame 32.

Figure 4:
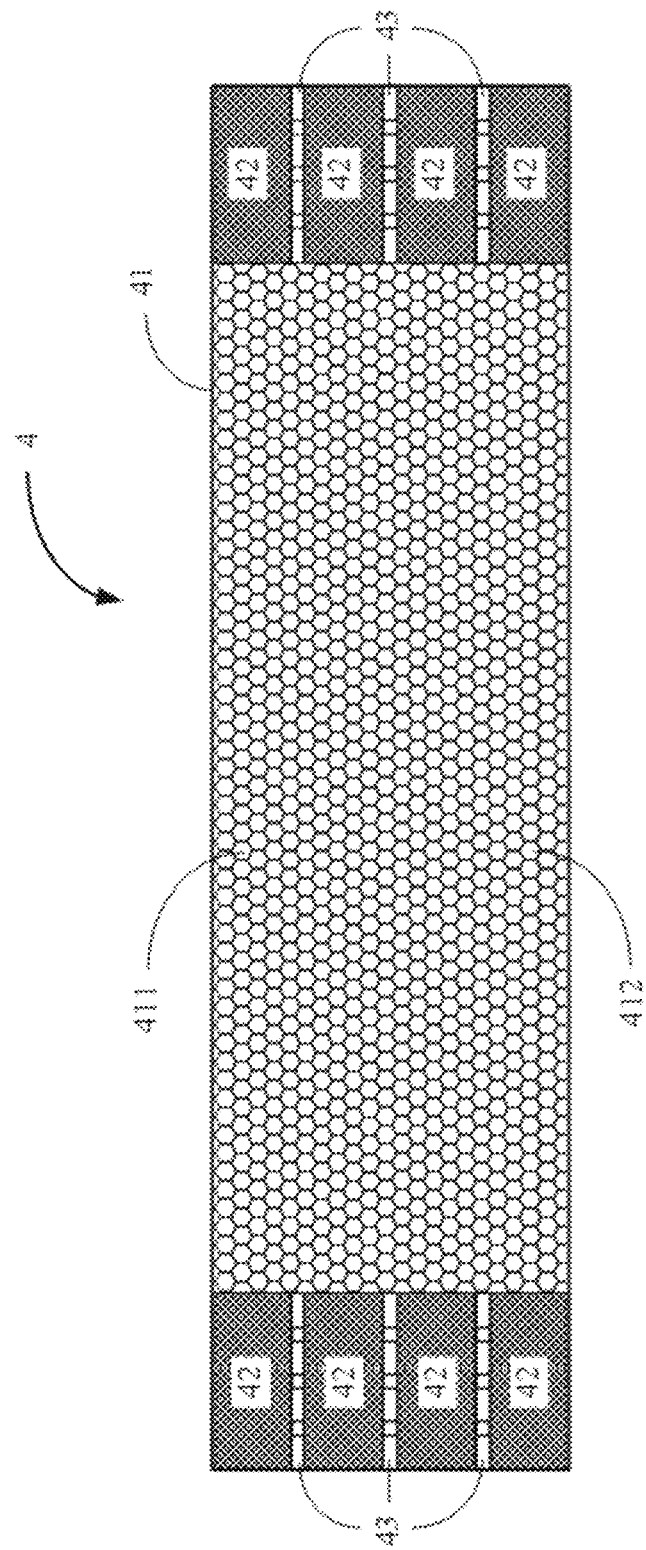
FIG. 4 illustrates a structure diagram of a stretching and folding assembly of the present disclosure.

As shown in FIG. 3 and FIG. 4, the connecting blocks 42 are disposed on the elastic assembly 4 and at two ends of the elastic assembly 4. In the connecting blocks 42, the connecting blocks 42 at the same end are disposed in parallel. The connecting pieces 43 has a stretching characteristic and sticky matter. Each is disposed between two adjacent ones of the connecting blocks 42 to connect the two adjacent ones of the connecting blocks 42 and configured to stretch the connecting blocks 42 to cause the connecting blocks 42 to drive, when the flexible display panel 2 is bent, the area of the middle frame 3 corresponding to the bendable area 21 to be bent or folded.

Figure 5:
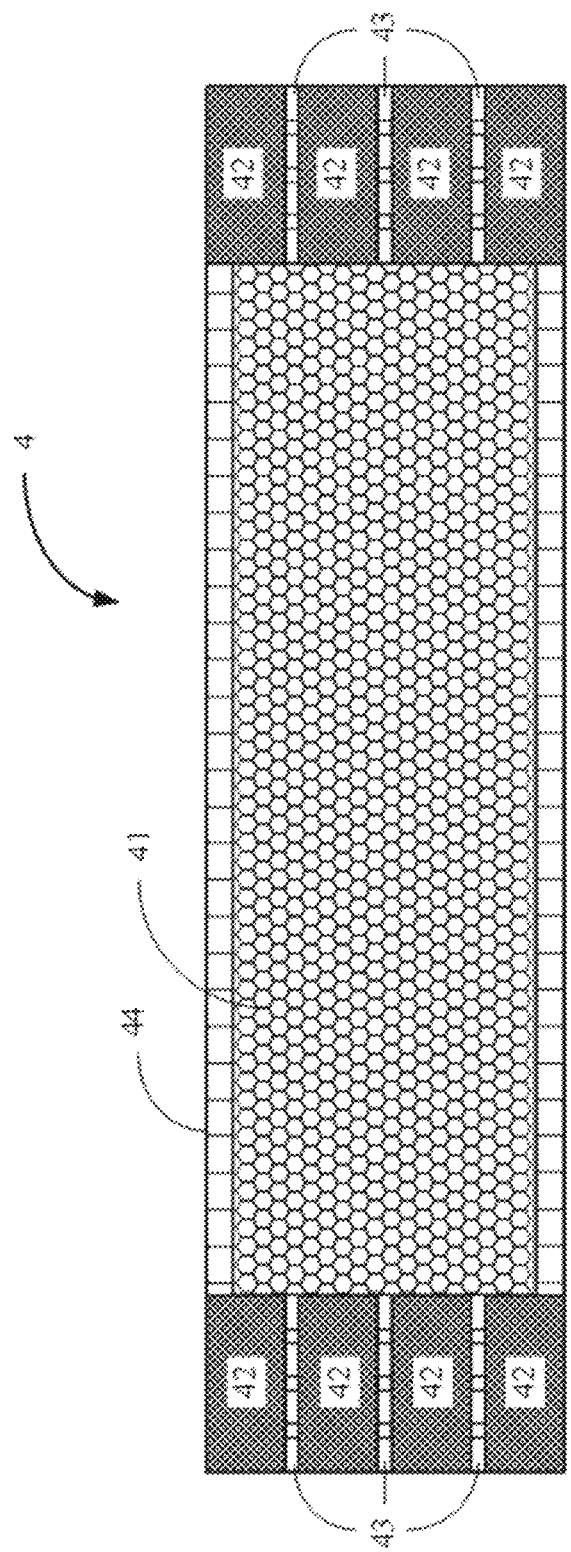
FIG. 5 illustrates a structure diagram of a stretching and folding assembly of the present disclosure.

In another embodiment, as shown in FIG. 5, the stretching and folding assembly 4 further includes a plurality of clamping bars 44 disposed at two sides (the top side and the bottom side) of the elastic assembly 41 and configured to fix the elastic assembly 41. The clamping bars 44 are embedded to the connecting blocks 42.

Figure 6:
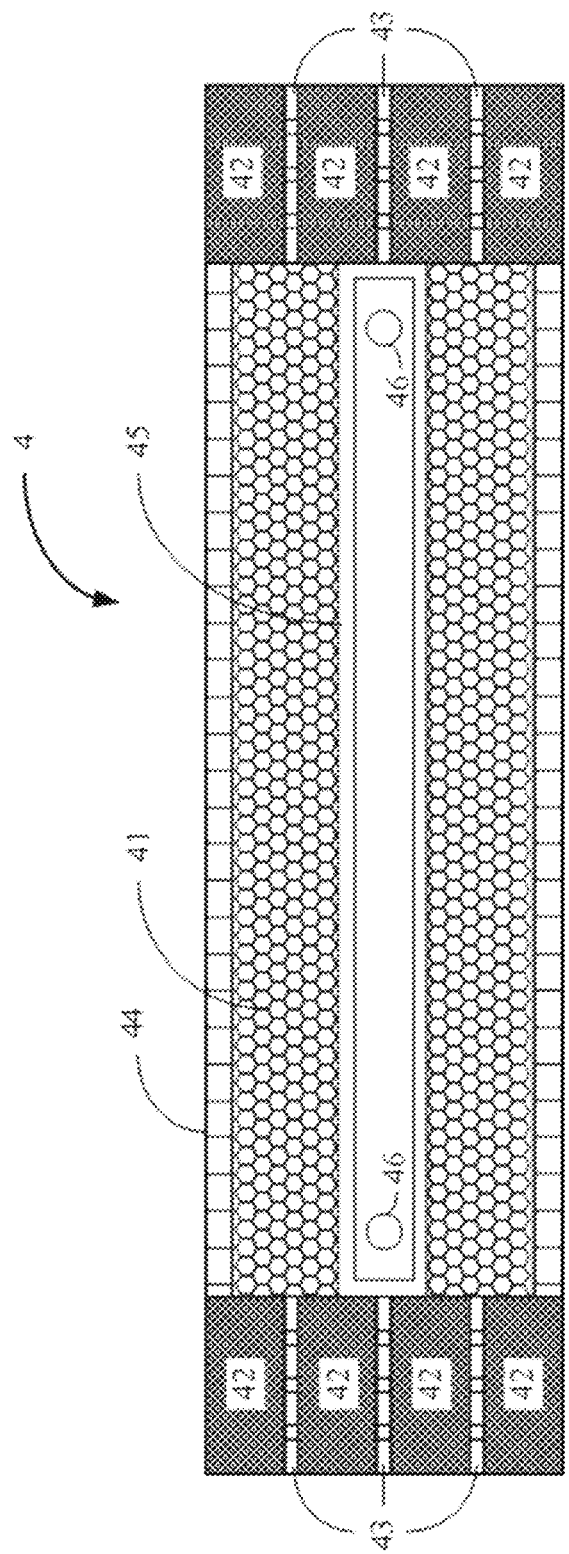
FIG. 6 illustrates a structure diagram of a stretching and folding assembly of the present disclosure.

In one embodiment, the stretching and folding assembly 4 further includes a strengthening bar 45 fixed on the elastic assembly 41 to increase stability of the bendable area 31. A material of the strengthening bar 45 can be a hard plastic material or a material having a large hardness. The strengthening bar 45 is plastically melted to be connected to the elastic assembly 41 to fix the elastic assembly 41. As shown in FIG. 6, the stretching and folding assembly 4 further includes a plurality of connecting patches 46 disposed at two ends of the strengthening bar 45 to fix the strengthening bar 45.

In summary, in the display device of the present disclosure, the stretching and folding assembly is disposed in the bendable area, and structures in which the connecting blocks and the connecting pieces are connected together are disposed in the area of the middle frame corresponding to the bendable area. The middle frame encompasses the periphery of the flexible display panel. As such, when the flexible display panel of the display device is bent or folded, the connecting pieces are stretched to drive the connecting blocks to bend or fold or the display device, thereby increasing quality of bending the display device and improving user experience as well.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above example descriptions, they have substantially been covered in the following claims as appended.

The invention claimed is:

1. A display device, comprising:
a flexible display panel bendable in a first direction and having a bendable area;
a middle frame encompassing a periphery of the flexible display panel; and
a stretching and folding assembly disposed in the bendable area and comprising:
an elastic assembly covering the bendable area and a part of the middle frame corresponding to the bendable area;
a plurality of connecting blocks disposed respectively at opposite ends of the elastic assembly in a second direction perpendicular to the first direction;
a plurality of connecting pieces each disposed between two adjacent ones of the connecting blocks to connect the two adjacent ones of the connecting blocks to each other, the connecting pieces being configured to, when the flexible display panel is bent, cause the connecting blocks to drive the part of the middle frame corresponding to the bendable area to be bent;
a strengthening bar fixed to the elastic assembly to increase stability of the bendable area, wherein the strengthening bar is plastically melted to be connected to the elastic assembly; and
a plurality of connecting patches disposed respectively at opposite ends of the strengthening bar in the second direction to fix the strengthening bar.

2. The display device of claim 1, wherein a material of the elastic assembly comprises rubber.

3. The display device of claim 1, wherein the stretching and folding assembly further comprises a plurality of clamping bars disposed respectively at two sides of the elastic assembly and configured to fix the elastic assembly, and one of the clamping bars is embedded to one of the connecting blocks.

4. The display device of claim 1, wherein a material of the strengthening bar comprises a hard plastic.

5. The display device of claim 1, wherein the middle frame comprises a top frame and a bottom frame, and the elastic assembly comprises a first elastic assembly and a second elastic assembly that are symmetrically and respectively disposed on the top frame and the bottom frame.

6. The display device of claim 1, wherein ones of the connecting blocks disposed at one of the opposite ends of the elastic assembly are arranged in parallel in a row.

7. The display device of claim 1, wherein the flexible display panel is divided into a top display part and a bottom display part with the bendable area as a center, and the bendable area is divided into a first bendable area positioned in the top display part and a second bendable area positioned in the bottom display part that are symmetrically covered by the stretching and folding assembly.

8. A display device, comprising:
a flexible display panel bendable in a first direction and having a bendable area;
a middle frame encompassing a periphery of the flexible display panel; and
a stretching and folding assembly disposed in the bendable area and comprising:
an elastic assembly covering the bendable area and a part of the middle frame corresponding to the bendable area;
a plurality of connecting blocks disposed respectively at opposite ends of the elastic assembly in a second direction perpendicular to the first direction;
a plurality of connecting pieces each disposed between two adjacent ones of the connecting blocks to connect the two adjacent ones of the connecting blocks and to each other, the connecting pieces being configured to, when the flexible display panel is bent, cause the connecting blocks to drive the part of the middle frame corresponding to the bendable area to be bent;
a strengthening bar fixed to the elastic assembly to increase stability of the bendable area; and
a plurality of connecting patches disposed respectively at opposite ends of the strengthening bar in the second direction to fix the strengthening bar.

9. The display device of claim 8, wherein a material of the elastic assembly comprises rubber.

10. The display device of claim 8, wherein the stretching and folding assembly further comprises a plurality of clamping bars disposed respectively at two sides of the elastic assembly and configured to fix the elastic assembly, and one of the clamping bars is embedded to one of the connecting blocks.

11. The display device of claim 8, wherein the strengthening bar is plastically melted to be connected to the elastic assembly.

12. The display device of claim 8, wherein a material of the strengthening bar comprises a hard plastic.

13. The display device of claim 8, wherein the middle frame comprises a top frame and a bottom frame, and the elastic assembly comprises a first elastic assembly and a second elastic assembly that are symmetrically and respectively disposed on the top frame and the bottom frame.

14. The display device of claim 8, wherein ones of the connecting blocks disposed at one of the opposite ends of the elastic assembly are arranged in parallel in a row.

15. The display device of claim 8, wherein the flexible display panel is divided into a top display part and a bottom display part with the bendable area as a center, and the bendable area is divided into a first bendable area positioned in the top display part and a second bendable area positioned in the bottom display part that are symmetrically covered by the stretching and folding assembly.

16. A display device, comprising:
- a flexible display panel bendable in a first direction and having a bendable area;
- a middle frame encompassing a periphery of the flexible display panel; and
- a stretching and folding assembly disposed in the bendable area and comprising:
  - an elastic assembly covering the bendable area and a part of the middle frame corresponding to the bendable area;
  - a plurality of connecting blocks disposed respectively at opposite ends of the elastic assembly in a second direction perpendicular to the first direction;
  - a plurality of connecting pieces each disposed between two adjacent ones of the connecting blocks to connect the two adjacent ones of the connecting blocks to each other, the connecting pieces being configured to, when the flexible display panel is bent, cause the connecting blocks to drive the part of the middle frame corresponding to the bendable area to be bent; and
  - a plurality of clamping bars disposed respectively at two sides of the elastic assembly and configured to fix the elastic assembly, wherein one of the clamping bars is embedded to one of the connecting blocks.

17. The display device of claim 16, wherein a material of the elastic assembly comprises rubber.

18. The display device of claim 16, wherein the stretching and folding assembly further comprises a strengthening bar fixed to the elastic assembly to increase stability of the bendable area.

19. The display device of claim 18, wherein the stretching and folding assembly further comprises a plurality of connecting patches disposed respectively at opposite ends of the strengthening bar in the second direction to fix the strengthening bar.

20. The display device of claim 18, wherein the strengthening bar is plastically melted to be connected to the elastic assembly.

* * * * *